(12) United States Patent
Karasik et al.

(10) Patent No.: US 10,953,817 B2
(45) Date of Patent: Mar. 23, 2021

(54) LOCKING BRACKET FOR VEHICLE ACCESSORY

(71) Applicant: Methode Electronics, Inc., Carthage, IL (US)

(72) Inventors: Vladimir Karasik, Walled Lake, MI (US); Mark Muscat, Carthage, IL (US)

(73) Assignee: Methode Electronics, Inc., Chicago, IL (US)

( * ) Notice: Subject to any disclaimer, the term of this patent is extended or adjusted under 35 U.S.C. 154(b) by 0 days.

(21) Appl. No.: 16/639,186

(22) PCT Filed: Aug. 15, 2018

(86) PCT No.: PCT/US2018/000191
§ 371 (c)(1),
(2) Date: Feb. 14, 2020

(87) PCT Pub. No.: WO2019/035922
PCT Pub. Date: Feb. 21, 2019

(65) Prior Publication Data
US 2021/0031703 A1 Feb. 4, 2021

Related U.S. Application Data

(60) Provisional application No. 62/545,773, filed on Aug. 15, 2017.

(51) Int. Cl.
*B60R 11/04* (2006.01)
*B60R 11/00* (2006.01)

(52) U.S. Cl.
CPC ....... *B60R 11/04* (2013.01); *B60R 2011/0059* (2013.01)

(58) Field of Classification Search
CPC .................................................. B60R 11/04
USPC ............................................................ 224/482
See application file for complete search history.

(56) References Cited

U.S. PATENT DOCUMENTS

| 5,588,055 | A | 12/1996 | Williamson et al. | |
| 5,779,205 | A | 7/1998 | Ching | |
| 5,785,222 | A * | 7/1998 | Basso | B60N 3/103 224/312 |
| 8,763,970 | B2 * | 7/2014 | Mordau | B60S 1/0888 248/300 |
| 8,857,687 | B1 | 10/2014 | An | |

(Continued)

FOREIGN PATENT DOCUMENTS

| EP | 3 173 289 A1 | 5/2017 |
| GB | 2 366 593 A | 3/2002 |

*Primary Examiner* — Justin M Larson
(74) *Attorney, Agent, or Firm* — Blank Rome LLP (57) ABSTRACT

A locking bracket for a vehicle accessory that has a main portion and a secondary portion, the main portion is configured to position the vehicle accessory in an operating position and includes opposite first and second faces extending between opposite ends, a spring leaf extending from the first face, first and second ribs extending from the second face, the first and second ribs being spaced from one another and having cooperating geometry to provide force to the spring leaf, at least first and second hinges separated by a distance, the first rib being located between the first and second hinges, and a locking mechanism provided on at least one of the ends, the locking mechanism being configured to maintain the vehicle accessory in the operating position.

18 Claims, 6 Drawing Sheets

(56) References Cited

U.S. PATENT DOCUMENTS

| | | | |
|---|---|---|---|
| 8,944,705 B1* | 2/2015 | Matori | F16M 13/00 |
| | | | 396/419 |
| 9,487,156 B2* | 11/2016 | Frenzel | B60R 11/02 |
| 9,802,550 B2* | 10/2017 | Kageyama | B60R 11/04 |
| 10,029,623 B2* | 7/2018 | Rawlings | B60R 11/04 |
| 10,139,707 B2* | 11/2018 | Carlson | G03B 17/02 |
| 10,189,421 B2* | 1/2019 | Matori | H04N 5/2254 |
| 10,220,799 B2* | 3/2019 | Kasai | H04N 5/2252 |
| 10,252,684 B2* | 4/2019 | Miyado | B60R 11/04 |
| 10,272,849 B2* | 4/2019 | Okuda | B60R 11/04 |
| 10,800,343 B2* | 10/2020 | Kasai | H05K 5/02 |
| 2007/0164188 A1* | 7/2007 | Mordau | B60S 1/0822 |
| | | | 248/503 |
| 2015/0030319 A1 | 1/2015 | Matori | |
| 2015/0109447 A1 | 4/2015 | Okuda | |
| 2015/0124150 A1* | 5/2015 | Hibino | H04N 5/238 |
| | | | 348/335 |
| 2016/0023620 A1* | 1/2016 | Matori | B60R 11/04 |
| | | | 348/148 |
| 2016/0257265 A1* | 9/2016 | Kageyama | B60R 11/04 |
| 2017/0274836 A1* | 9/2017 | Kasai | B60R 11/04 |
| 2019/0168688 A1* | 6/2019 | Yamamoto | H04N 5/2257 |

\* cited by examiner

LOCKING BRACKET FOR VEHICLE ACCESSORY

RELATED APPLICATION

This application claims priority to U.S. Provisional Application No. 62/545,773 filed on Aug. 15, 2017, the subject matter of which is herein incorporated by reference.

FIELD OF THE INVENTION

The present invention relates to a bracket for positioning a vehicle accessory, such as a camera or sensor, on a vehicle and locking the same in its proper position.

BACKGROUND

Mounting of vehicle accessories, such as cameras and sensors, on a vehicle is often cumbersome and time consuming, requiring assembly and fastening of multiple parts. A need exists for a locking mechanism, such as a bracket, for mounting a vehicle accessory that has a simplified compact design and locks the vehicle accessory in proper position without the need for multiple parts or fasteners.

SUMMARY

Accordingly, the present invention may provide a locking bracket for a vehicle accessory that comprises a main portion and a secondary portion and the main portion being configured to position the vehicle accessory in an operating position. The main portion comprises opposite first and second faces extending between opposite ends, a spring leaf extending from the first face, first and second ribs extending from the second face, the first and second ribs being spaced from one another and having cooperating geometry to provide force to the spring leaf, at least first and second hinges separated by a distance, the first rib being located between the first and second hinges, and a locking mechanism provided on at least one of the ends, the locking mechanism being configured to maintain the vehicle accessory in the operating position.

In certain embodiments, the secondary portion extends from a side of the main portion, the secondary portion being shaped to accept a connection part of the vehicle accessory; a third hinge may be provided on one of the ends of the main portion that is configured for a hinge connection to a vehicle body or a module housing; the third hinge is configured for hinge connection to a vehicle cover component; the main portion and the vehicle cover component are integral; the first and second faces of the main portion are outer and inner faces, respectively; and/or the first and second hinges of the main portion are first and second folds in the main portion.

In other embodiments, the locking mechanism comprises a snap at one end of the main portion configured to snap into a cooperating opening on the other end of the main portion; and/or at least one attachment member is provided for mounting the locking bracket to the vehicle.

The present invention may also provide a locking bracket for a vehicle accessory that comprises a main portion and a secondary portion, the main portion being configured to position the vehicle accessory in an operating position. The main portion is a unitary one-piece member that comprises opposite first and second faces extending between opposite ends, a spring leaf extending from the first face, first and second ribs extending from the second face, the first and second ribs being spaced from one another and having cooperating geometry to provide force to the spring leaf, at least first and second hinges separated by a distance, the first rib being located between the first and second hinges, and a locking mechanism provided on at least one of the ends, the locking mechanism being configured to maintain the vehicle accessory in the operating position.

In some embodiment, the secondary portion extends from a side of the main portion, the secondary portion being shaped to accept a connection part of the vehicle accessory; the main portion and the secondary portion are integral; a third hinge is provided on one of the ends of the main portion configured for a hinge connection to a vehicle body or a module housing; the third hinge is configured for hinge connection to a vehicle cover component; the first and second faces of the main portion are outer and inner faces, respectively; and/or the first and second hinges of the main portion are first and second folds in the main portion.

In one embodiment, the locking mechanism comprises a snap at one end of the main portion configured to snap into a cooperating opening on the other end of the main portion. In another embodiment, at least one attachment member is provided for mounting the locking bracket to the vehicle.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing figures.

DETAILED DESCRIPTION

Referring to the figures, the present invention relates to a locking bracket 100 for a vehicle accessory 10, such as a camera, sensor, or the like, that has a simplified compact design and locks the desired or operating position of the vehicle accessory 10 without the need for any fasteners. In a preferred embodiment, the locking bracket 100 is molded as a unitary one-piece member. The locking bracket 100 may attach to a cover component 12 that is mounted to a vehicle body or module housing of the vehicle. In a preferred embodiment, the locking bracket 100 is integral with the cover component 12.

Figure 1:
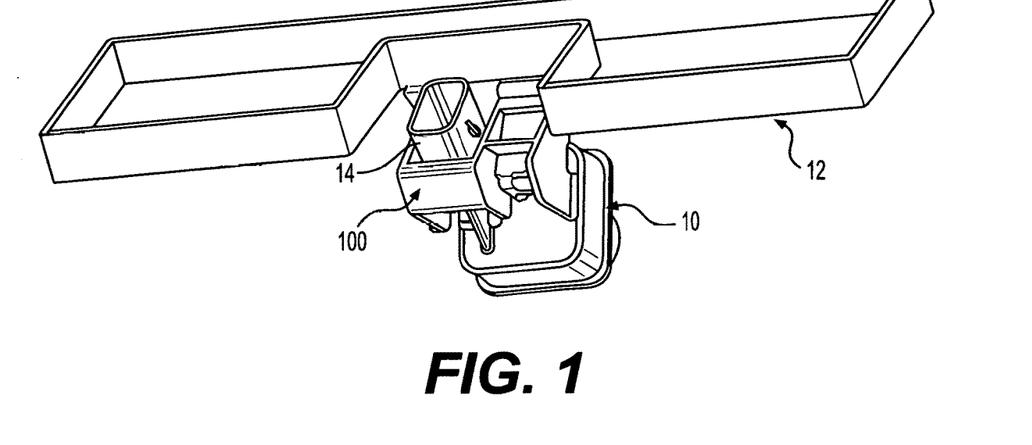
FIG. 1 is a perspective view of a locking bracket according to an exemplary embodiment of the present invention, showing the locking bracket with a vehicle accessory and showing it integrally attached to a vehicle component.
Figure 2A:
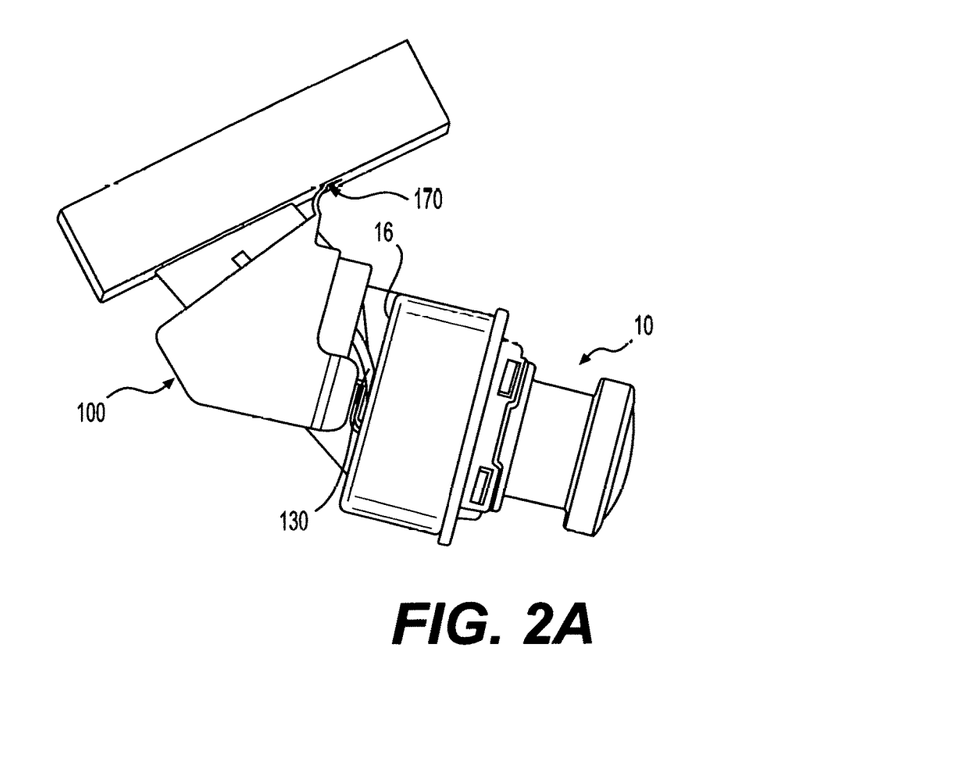
FIG. 2A is side elevational view of the locking bracket, cover component, and vehicle accessory illustrated in FIG. 1.
Figure 2B:
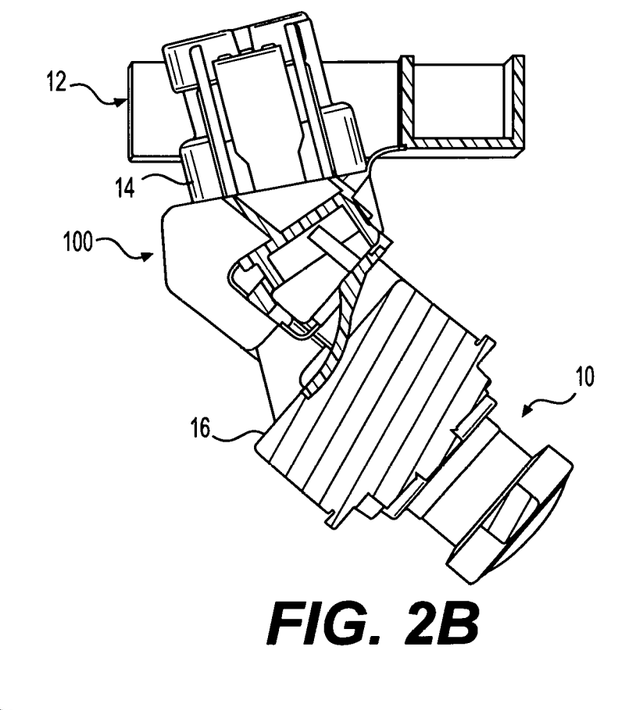
FIG. 2B is a cross-sectional view of FIG. 2A.
Figure 3:
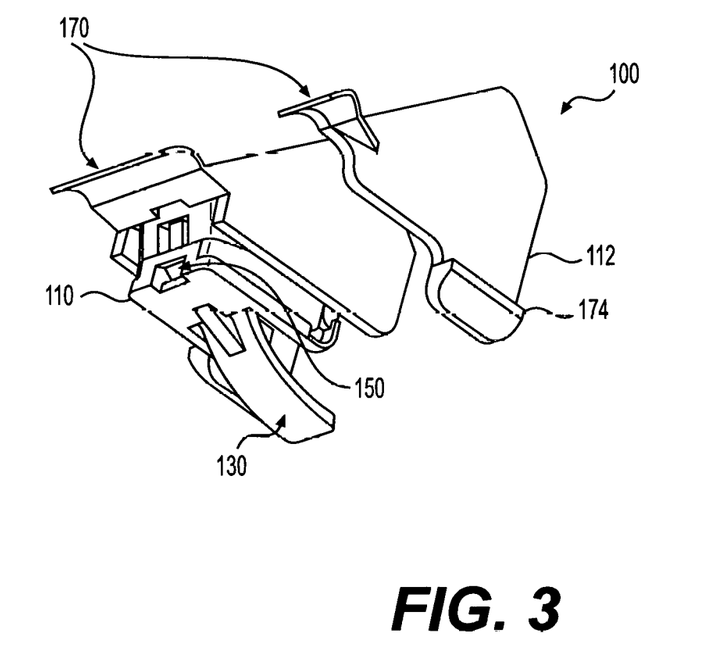
FIG. 3 is a perspective view of the locking bracket illustrated in FIG. 1, showing the locking bracket in a folded and locked position.

As seen in FIGS. 1-3, the locking bracket 100 generally includes a main portion 110 that positions the vehicle accessory 10 with respect to the vehicle and locks the same in that position, and a secondary portion 112 that extends from the main portion 110 and accepts at least a portion, such as a connection part 14, of the accessory 10. The connection part 14 may be, for example, a socket that connects to the electrical system of the vehicle.

Figure 4:
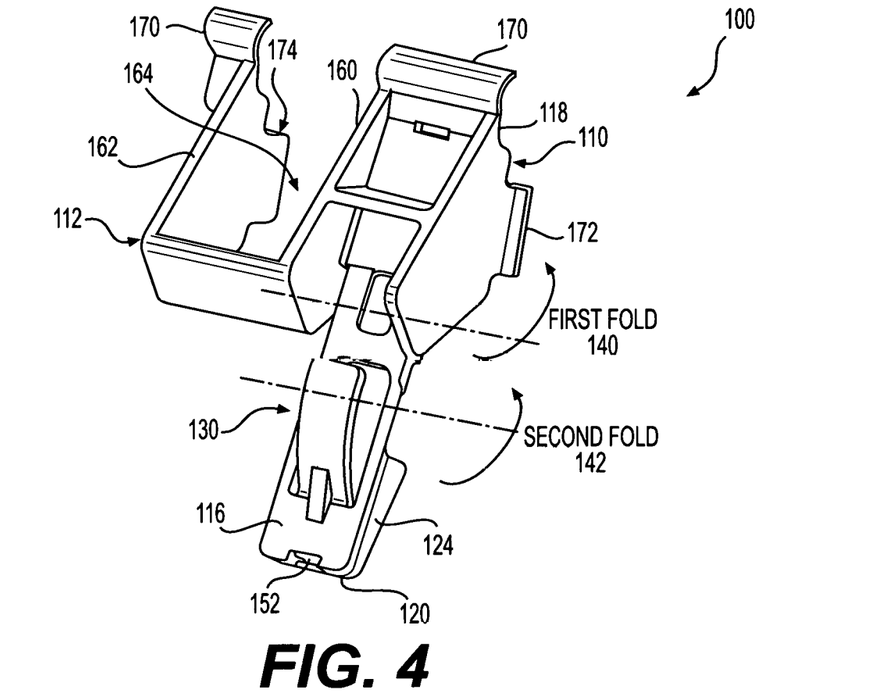
FIG. 4 is a perspective view of the locking bracket illustrated in FIG. 1, showing the locking bracket in an unfolded position.
Figure 5:
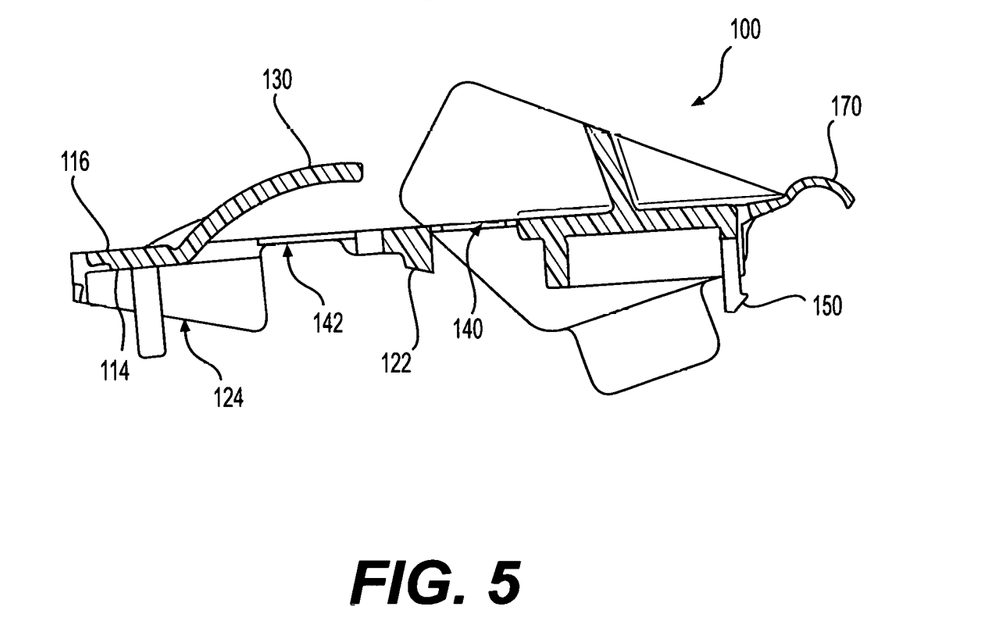
FIG. 5 is side cross-sectional view of the locking bracket illustrated in FIG. 4.
Figure 6:
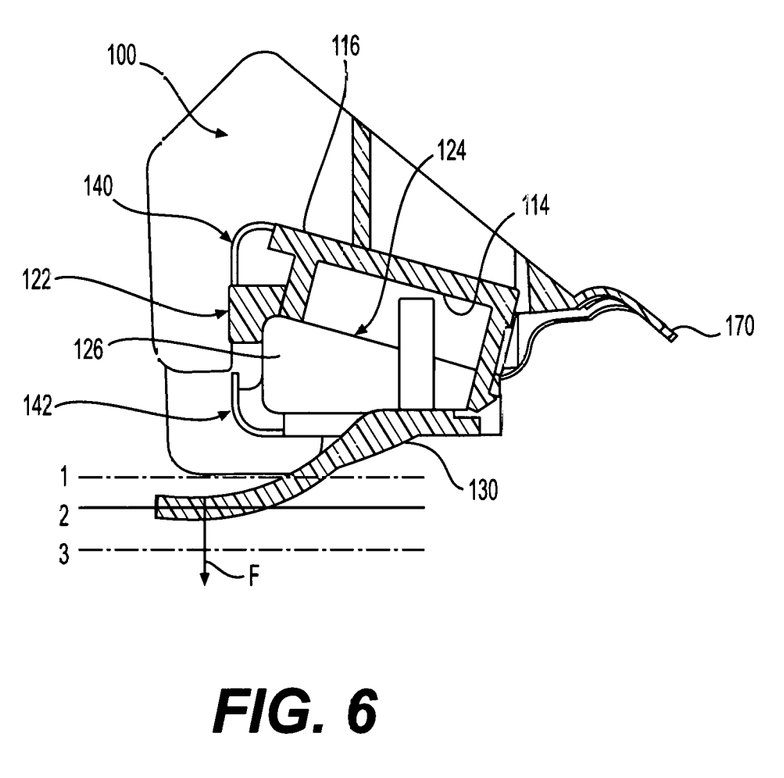
FIG. 6 is a side cross-sectional view of the locking bracket in the folded position as illustrated in FIG. 3, showing various possible positions of the bracket.
Figure 7:
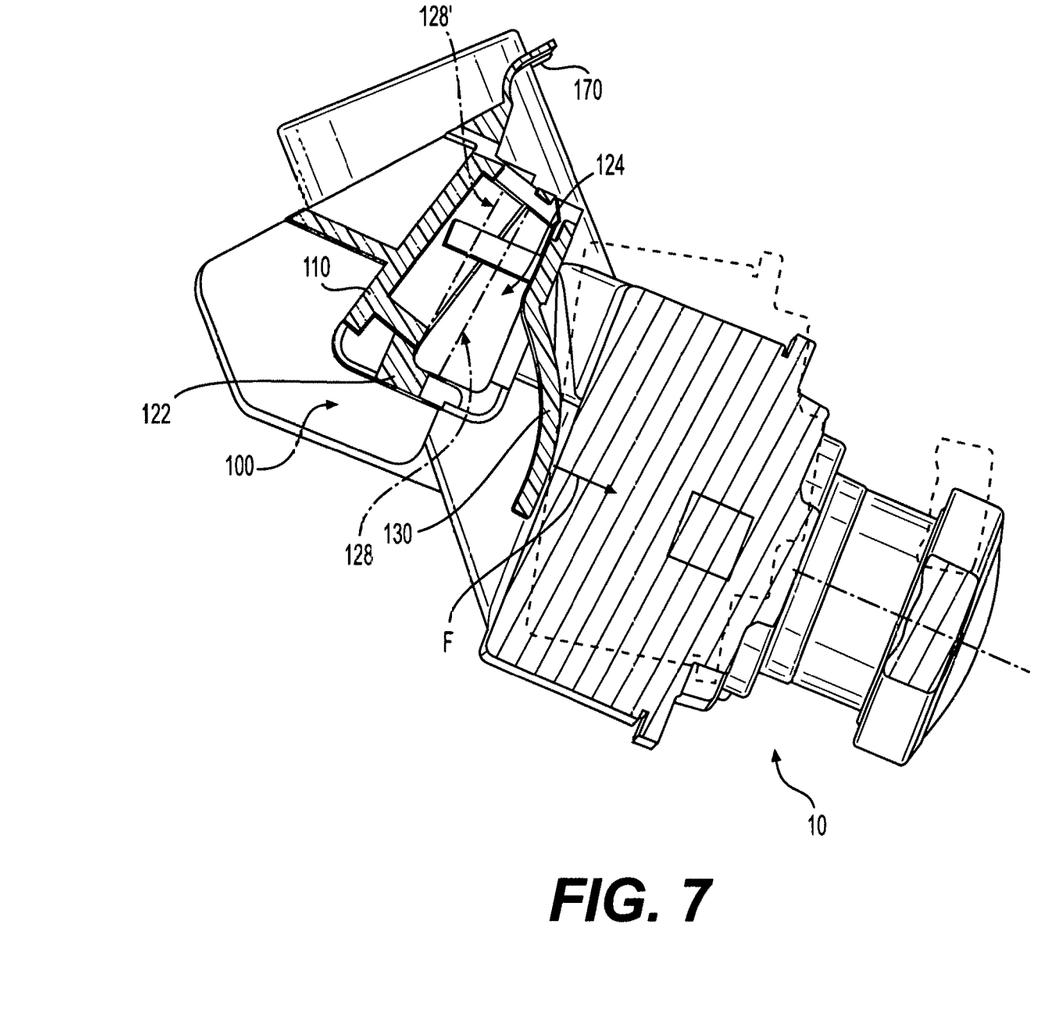
FIG. 7 is a side cross-sectional view similar to FIG. 2A, showing adjustment of the position of the locking bracket and vehicle accessory.
Figure 8:
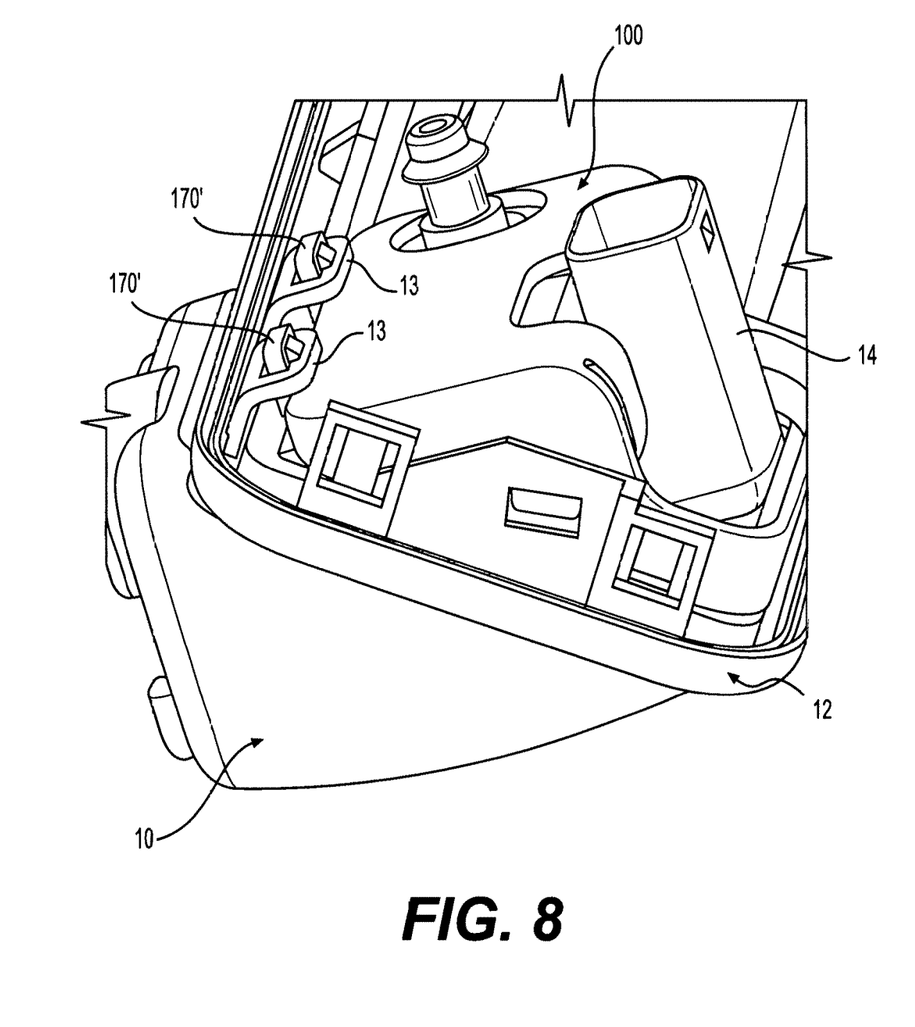
FIG. 8 is a rear perspective view of the locking bracket illustrated in FIG. 1, showing the an alternative of coupling the locking bracket to the cover component.

Main portion 110 has opposite faces such that when the bracket is folded, one face is an inner face 114 and the other face is an outer face 116. The faces 114 and 116 extend between opposite ends 118 and 120 of main portion 110, as seen in FIGS. 4-6. A spring leaf 130 extends outwardly from outer face 116 of main portion 110 and is adapted to apply a spring force away from outer face 116 and abut against a surface 16 of the accessory 10 to maintain the accessory 10 in proper operating position (e.g. with respect to the vehicle body or module housing), as seen in FIGS. 2A and 2B. First and second ribs 122 and 124 extend from inner surface 114 of main portion 110. First and second ribs 122 and 124 preferably have cooperating geometry, in order to provide the spring leaf 130 with force vector F that is normal or substantially normal to the back face 16 of accessory 10, as seen in FIGS. 6 and 7. That is first rib 122 is sized and shaped to cooperate with the size and shape of the second rib 124 and particularly its end portion 126 (FIG. 6). The first rib 122 may be smaller than the second rib 124 and engages the end portion 126 of the second rib 124.

The geometry of the ribs 122 and 124 may be changed to adjust to any up or down position of the accessory 10, as seen in FIGS. 6 and 7. For example, the geometry of first and second ribs 122 and 124 may be modified depending on a desired orientation of the accessory, like a camera, such that the spring leaf's force vector F is maintained normal or substantially normal to the camera position in the vehicle body or module housing.

For example, a segment of the rib 124, delineated by dashed line 128, may be removed from rib 124 to cooperate with rib 122 when rotating the accessory clockwise to adjust the accessory's position downwardly, as seen in FIG. 7. Alternatively, a segment, delineated by dashed line 128', may be added to rib 124 to cooperate with rib 122 when rotating the accessory position counterclockwise to a new accessory position. In either case, the cooperating geometry of the ribs 122 and 124 should result in the force vector F applied to accessory 10 being normal or substantially normal to the back 16 of the accessory 10. In one embodiment, the first and second ribs 122 and 124 may be formed separately (based on the desired camera orientation) from the bracket's main portion 110 as inserts provided in the mold construction of the bracket.

Main portion 110 has at least first and second hinges 140 and 142 that allow folding of bracket 100 twice. First and second hinges 140 and 142 may be living hinges, for example, incorporated into main portion 110. The hinges 140 and 142 are preferably spaced from one another with the rib 122 being located therebetween, as seen in FIGS. 4 and 6.

To lock the accessory 10 in its proper position, bracket 100 is provided with a locking mechanism on its main portion 110. For example, the locking mechanism may be a cooperating snap 150 and opening 152 located at the ends 118 and 120, respectively, of main potion 110, as best seen in FIGS. 4 and 5. When bracket 100 is folded at first and second hinges 140 and 142, snap 150 can be inserted into opening 152, as seen in FIG. 3, to couple the ends 118 and 120 together and lock the accessory 10 in its position. By incorporating the hinges 140 and 142 in the bracket 100, which allow the bracket 100 to fold twice and then lock via the locking mechanism 150, 152, no fasteners are needed to appropriately position the accessory. It will be understood, however, that any known locking methods may be used, such as adhesive, fasteners, and the like, instead of or in addition to snap 150 and opening 152.

The secondary portion 112 of bracket 100 extends from a side of main portion 110. Second portion 112 may extend from a side wall 160 of main portion 110, as seen in FIG. 4. Another side wall 162 may be provided on the opposite side of main portion 110. A receiving area 164 is defined between the walls 160 and 162 which is sized and configured to accept the connection part 14 of accessory 10. For example, secondary portion 112 may have a generally U-shape that at least partially surrounds the connection part 14, as best seen in FIG. 1.

One or more additional hinges 170 may be provided on one or both of main and secondary portions 110 and 112, as seen in FIG. 3, that are configured to connect to cover component 12. One of the hinges 170 may be located at the end 118 of the main bracket 110. Another of the hinges 170 may be located at a free end of secondary portion 112. In a preferred embodiment, each third hinge 170 is a living hinge formed integrally with the cover component 14, as seen in FIGS. 1 and 2A.

To attach the bracket 100 to the vehicle, one or more attachment members may be provided on the bracket 100 that are configured to engage the vehicle. For example, first and second attachment members 172 and 174 may be provided at the ends of main and secondary portions 110 and 112 and can be spaced from hinges 170, as seen in FIGS. 3 and 4. Each attachment member 172 and 174 may be configured, for example, as an arm or rib that snaps into the module housing of the vehicle or vehicle body, which holds the accessory.

While particular embodiments have been chosen to illustrate the invention, it will be understood by those skilled in the art that various changes and modifications can be made therein without departing from the scope of the invention as defined in the appended claims.

What is claimed is:

1. A locking bracket for a vehicle accessory, comprising:
    a main portion and a secondary portion, the main portion being configured to position the vehicle accessory in an operating position, the main portion comprising,
    opposite first and second faces extending between opposite ends,
    a spring leaf extending from the first face,
    first and second ribs extending from the second face, the first and second ribs being spaced from one another and having cooperating geometry to provide a normal or substantially normal vector force to the spring leaf,
    at least first and second hinges separated by a distance, the first rib being located between the first and second hinges, and
    a locking mechanism provided on at least one of the ends, the locking mechanism being configured to maintain the vehicle accessory in the operating position.

2. The locking bracket of claim 1, wherein the secondary portion extends from a side of the main portion, the secondary portion being shaped to accept a connection part of the vehicle accessory.

3. The locking bracket of claim 1, further comprising a third hinge provided on one of the ends of the main portion configured for a hinge connection to a vehicle body or a module housing.

4. The locking bracket of claim 3, wherein the third hinge is configured for hinge connection to a vehicle cover component.

5. The locking bracket of claim 4, wherein the main portion and the vehicle cover component are integral.

6. The locking bracket of claim 1, wherein the first and second faces of the main portion are outer and inner faces, respectively; and the first and second hinges of the main portion are first and second folds in the main portion.

7. The locking bracket of claim 1, wherein the first rib is smaller than the second rib and engages an end portion of the second rib.

8. The locking bracket of claim 1, wherein the locking mechanism comprises a snap at one end of the main portion configured to snap into a cooperating opening on the other end of the main portion.

9. The locking bracket of claim 1, further comprising at least one attachment member for mounting the locking bracket to the vehicle.

10. A locking bracket for a vehicle accessory, comprising:
a main portion and a secondary portion, the main portion being configured to position the vehicle accessory in an operating position, the main portion being a unitary one-piece member comprising,
opposite first and second faces extending between opposite ends,
a spring leaf extending from the first face,
first and second ribs extending from the second face, the first and second ribs being spaced from one another and having cooperating geometry to provide force to the spring leaf,
at least first and second hinges separated by a distance, the first rib being located between the first and second hinges, and
a locking mechanism provided on at least one of the ends, the locking mechanism being configured to maintain the vehicle accessory in the operating position.

11. The locking bracket of claim 10, wherein the secondary portion extends from a side of the main portion, the secondary portion being shaped to accept a connection part of the vehicle accessory.

12. The locking bracket of claim 11, wherein the main portion and the secondary portion are integral.

13. The locking bracket of claim 10, further comprising a third hinge provided on one of the ends of the main portion configured for a hinge connection to a vehicle body or a module housing.

14. The locking bracket of claim 13, wherein the third hinge is configured for hinge connection to a vehicle cover component.

15. The locking bracket of claim 10, wherein the first and second faces of the main portion are outer and inner faces, respectively; and the first and second hinges of the main portion are first and second folds in the main portion.

16. The locking bracket of claim 15, wherein the first rib is smaller than the second rib and engages an end portion of the second rib.

17. The locking bracket of claim 10, wherein the locking mechanism comprises a snap at one end of the main portion configured to snap into a cooperating opening on the other end of the main portion.

18. The locking bracket of claim 10, further comprising at least one attachment member for mounting the locking bracket to the vehicle.

\* \* \* \* \*